April 15, 1958 W. G. FALTIN 2,830,748
LITTER RECEPTACLE FOR VEHICLES AND THE LIKE
Filed Sept. 10, 1954
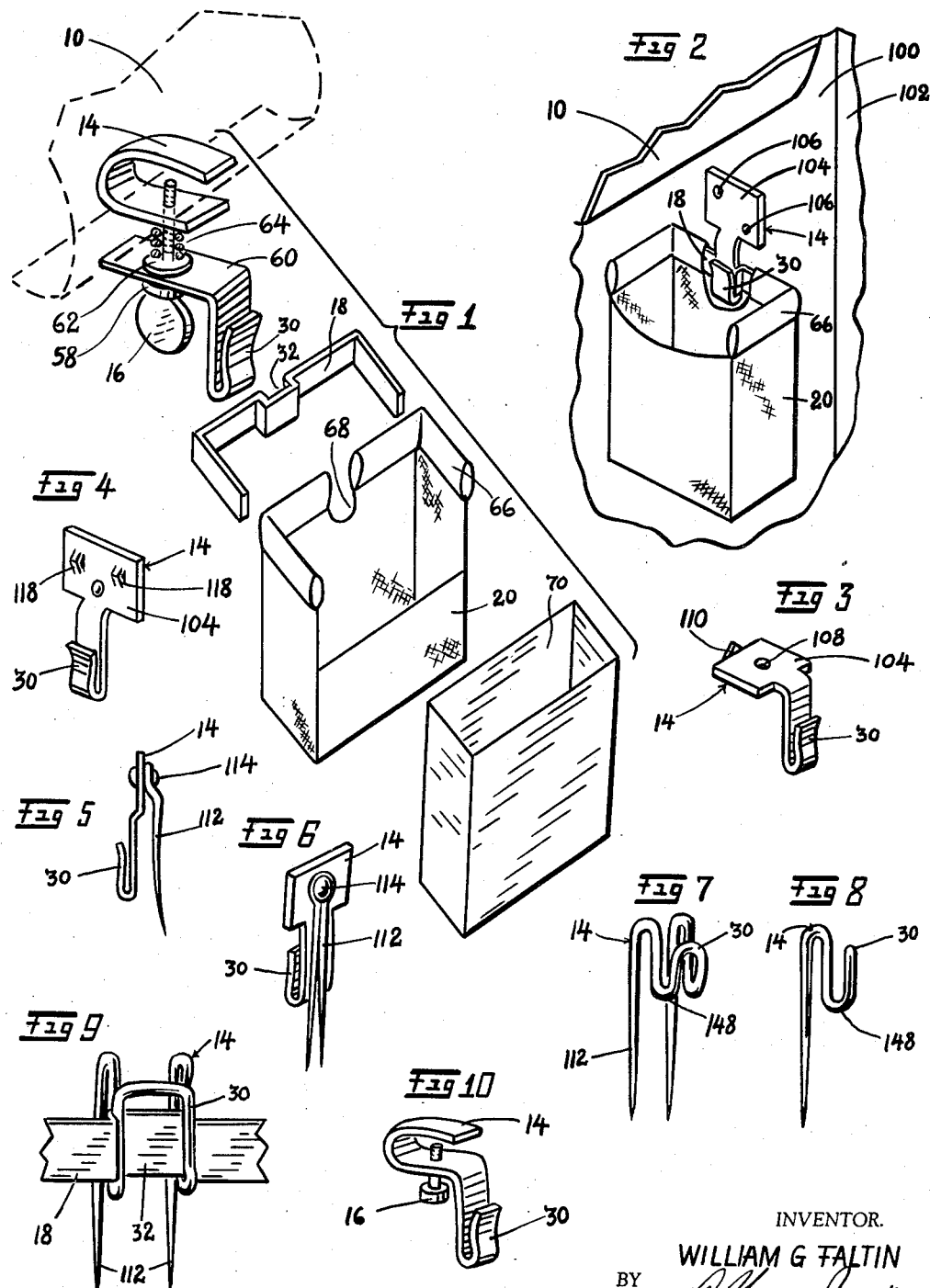
INVENTOR.
WILLIAM G FALTIN
BY
ATTORNEY

United States Patent Office 2,830,748
Patented Apr. 15, 1958

2,830,748

LITTER RECEPTACLE FOR VEHICLES AND THE LIKE

William G. Faltin, York, Pa.

Application September 10, 1954, Serial No. 455,214

12 Claims. (Cl. 224—42.46)

This invention relates to a receptacle for holding refuse, waste material and the like, generally termed litter herein, and, more particularly, the invention relates to such a receptacle for use in vehicles and the like.

At the present time, considerable concern exists relative to the thoughtless discarding of waste litter such as empty cigarette packages, paper tissues and napkins, paper cups, sandwich wrapping papers, banana peels, soft drink bottles, and the like upon roads and highways throughout the country, the same greatly detracting from the appearance of the highways and our cities, towns and countrysides. Efforts are being promoted by certain organizations to reduce such habits of motorists to discard refuse of this nature along the highways as they drive over them. Perhaps one reason for motorists discarding such waste material carelessly through the windows as they drive along is that there usually is no convenient place or receptacle within the vehicle for accumulating such waste material until an opportunity is had to discard it in a suitable manner so as not to render the streets and highways unsightly, such as placing it in a public trash receptacle or by removing it from the vehicle upon arriving at home or another destination.

The present popularity of packaged goods consumed by motorists while traveling renders the problem of disposing of wrappers and packages constantly more acute. Hence, the principal purpose of the present invention is to provide a number of embodiments of simple, inexpensive and highly utilitarian receptacles primarily for installation in vehicles and conveniently located therein in order that refuse and litter material of various natures may be deposited temporarily in the receptacle and the latter emptied at convenient receiving points such as trash receptacles, gasoline filling stations, or one's own trash can. These various embodiments of the invention which are illustrated herein essentially comprise a bracket which is attachable to a fixed portion of the vehicle, for example, a receptacle which is preferably flexible for convenience in storing and mounting, and a stiffening and supporting member which is either attached or attachable to the upper end of the receptacle, for example, and in turn is connectable or connected to the bracket for support thereby in the vehicle. The various embodiments of the invention may be mounted in a number of convenient locations within a vehicle such as under the dash panel or adjacent either end thereof, the side panel of the vehicle adjacent the fire wall of the body, on one of the door panels, upon the back of the front seat of the two seated vehicle, or in any other suitable location within the vehicle where the receptacle particularly will not inconvenience the passangers, yet will be located conveniently for disposing trash and refuse material therein by the occupants of the vehicle.

Concerning some of the embodiments of the invention illustrated and described hereinafter, it is contemplated that the receptacle may be of a permanent nature and quickly detached from the supporting brackets for emptying, or the receptacle may include a replaceable liner which is disposable with the contents thereof at a suitable location and an inexpensive replacement liner then may be inserted within the receptacle for subsequent use and disposal.

In the preferred embodiments of the invention, it is contemplated that the bracket of the receptacle easily and quickly may be attached, either permanently or detachably to a part of the vehicle capable of supporting the same. Also, the receptacle preferably may be formed of a material having a suitable pattern or color harmonious with the interior of the vehicle particularly so as to render the same attractive and appealing to the user.

Details of the various embodiments of the invention illustrated in the drawings comprising a part of the following specification are described hereinafter and the advantages and characteristics thereof are set forth therein.

In the drawings:

Fig. 1 is an exploded perspective view of an embodiment of receptacle assembly in which a replaceable lining member is included for purposes of being contained within the receptacle member per se.

Fig. 2 is a perspective view showing a receptacle assembly embodying the principles of the invention and adapted primarily for attachment to a side panel of a vehicle or the like, the portion of the vehicle to which the receptacle assembly is attached herein being shown fragmentarily.

Fig. 3 is a perspective view of a bracket to support a receptacle and somewhat modified from the bracket shown in Fig. 2.

Fig. 4 is a perspective view of another embodiment of bracket having a hook thereon and adapted particularly for insertion beneath the window trim strip of a vehicle.

Figs. 5 and 6 respectively show side elevation and rear perspective views of a further embodiment of bracket having a hook thereon for receiving a supporting member for a receptacle in accordance with the principles of the invention.

Figs. 7 and 8 respectively illustrate perspective and side elevations of still another form of bracket member having pointed prongs thereon.

Fig. 9 is a perspective fragmentary view of a further embodiment of bracket having a slightly different shape of attaching means for connecting the bracket member to the supporting member.

Fig. 10 is a perspective view of a bracket which is more simple than that shown in Fig. 1 but including the basic principles thereof.

As is obvious from the various figures contained in the drawings, the present invention is capable of wide variation yet embodies a limited number of basic principles common to the various forms of receptacle assemblies illustrated in the drawings. Thus, it is intended that the various illustrations of different forms shown in the drawings represent a number of possibilities of the invention rather than different embodiments thereof. In general, the various forms and particularly the assemblies illustrated in the drawings include, in the main, three principal elements comprising a bracket, a supporting member, and a receptacle, the supporting member generally serving as a reinforcing and stiffening means for the receptacle to permit the receptacle to be made from flexible material to render the same capable of being packaged and stored compactly until used. Also, the supporting member serves as a convenient means for connecting the assembled or united supporting member and receptacle to the bracket which is affixed to the vehicle, for example.

Further, the term "vehicle" is used herein preferably in its broadest sense and includes such vehicles as automobiles, busses, trucks, railway cars, airplanes, and the like. Also, while the receptacle primarily has been designed to accommodate waste and discardable material generically referred to as litter, it will be understood that the receptacle may be used, if desired, to accommodate material other than in this category.

Referring now to the various figures of the drawings, and particularly Fig. 1, there is illustrated therein, in fragmentary manner, the lower portion of a dash panel 10 of a vehicle. Modern dash panels usually extend downward and inward toward the firewall of a vehicle, terminating in an inner edge 12. This inner edge forms a convenient flange-like means to which a bracket 14 may be attached either permanently or detachably. In the embodiment illustrated in Fig. 1, the bracket 14 is C-shaped and a threaded thumb screw 16 affords a simple and inexpensive means for connecting the bracket 14 to the edge 12 of the dash panel.

The bracket 14 may be either integral with or articulated to a supporting member 18. The upper end of a receptacle member 20 is connected to the supporting member 18, either permanently or detachably, to hold the upper end of the receptacle 20 connected to the supporting member 18.

The receptacle assembly comprising the brackets, supporting member and receptacle member illustrated in Fig. 1, is supported by the dash panel 10 in such manner that litter and other material may be conveniently deposited within the receptacle member 20, yet the receptacle assembly will not interfere with any of the passengers in the vehicle and is relatively inconspicuous, while convenient.

In Fig. 1, the preferred embodiment of the invention is shown in exploded perspective manner, the same including a bracket 14 which is swivelly connected to the hook member 30. In this construction, the thumb screw 16 is provided with a flange 58 which engages the undersurface of an extension 60 on hook member 30 and a washer 62 is mounted on the threaded stem of the thumb screw 16 so as to engage the upper surface of the hook extension 60. A compression spring 64 surrounds the thumb screw 16 and is disposed between washer 62 and the lower arm of the bracket 14, as clearly shown in Fig. 1. This arrangement provides for tension upon the hook extension 60, yet permits the thumb screw 16 to be moved into engagement with a supporting member such as the lower edge of a dash panel, for purposes of clamping the bracket 14 thereto. Inasmuch as the hook 30 is pivotally connected to the bracket 14, the receptacle 20 may be disposed, for example, in a projected, material receiving position, and then moved either to a less conspicuous or more convenient position as when the receptacle is not needed.

In the arrangement shown in Fig. 1, the supporting member 18 is generally U-shaped, preferably formed from resilient strip-like metal to permit flexing of the legs thereof toward and from each other, and also may be provided with an offset portion 32 for engagement with the hook 30.

To conveniently connect the supporting member 18 to the receptacle 20, a hem 66 is formed in the upper end of certain of opposed pairs of side walls thereof and the rear wall of suitable size to permit the supporting member 18 to be slipped therethrough whereby the receptacle is supported principally by the rear wall thereof which is suspended from supporting member 18. Such arrangement holds the upper end of the receptacle open and the opposed pairs of side walls spaced apart yet permits flexing and bulging of the front panel of receptacle 20 to facilitate insertion and removal of litter. To prevent interference of the receptacle 20 with the hook 30, a notch 68 may be formed in the upper end of the receptacle as shown in Fig. 1. In this particular illustration, it is contemplated that the receptacle 20 may also include a disposable lining member or sub-receptacle 70 which may be formed for example from moisture-resistant paper stock, synthetic resin, or the like, and the size is such that it may readily be received within the receptacle 20. When it is desired to empty the receptacle and the liner 70, it is only necessary to remove the lining member 70 from the receptacle 20 and replace it with an unused one. Under these circumstances, it is contemplated that the receptacle 20 per se will be of a permanent nature and not replaced except when damaged or soiled beyond further use, for example. Further, the front panel or wall thereof may be shorter from the top than the other panels or side walls thereof to facilitate insertion and removal of the member 70 or litter. If preferred, a more simple type of bracket 14 may be used than that shown in Fig. 1, such as is shown exemplarily in Fig. 10, wherein a hook 30 is integral with the C-shaped upper portion which directly engages the inner edge 12 of dash panel 10. The clamping screw 16 is threaded directly through the bracket.

In Fig. 2, another type of receptacle assembly is shown, this type primarily being intended for attachment to a suitable vertical panel in a vehicle, for example, such as the side panel adjacent the fire wall, or a door panel, but it is not intended that the specific mentioning of these several panels shall be considered restrictive. Referring to Fig. 2, it will be seen that the side panel 100 is illustrated adjacent one end of the dash panel 10 and a fragment of the door panel 102 also is shown. This arrangement presents one exemplary type of panel to which the receptacle assembly may be affixed by using a bracket 14 including a plate-like attaching piece 104 which, preferably, is integral with the hook 30. If desired, the hook may be laterally offset a slight distance from the plate piece 104. It is intended that the bracket 14 may be attached in a number of suitable convenient ways such as by using an appropriate cement against the outer face of the plate piece 104 and adhering the same to the panel 100. Also, if desired, the plate piece 104 may be provided with one or more apertures 106 in the event it is convenient to secure the bracket to the panel by screws or any other similar fastening means.

Any convenient form of receptacle member 20 per se may be used in conjunction with the bracket 14 in Fig. 2.

Fig. 3 represents a bracket similar to that illustrated in Fig. 2 but the bracket 14 comprises a plate piece 104 which extends substantially at right angles to the hook member 30. This is a convenient design of bracket for attachment to the lower panel of a glove compartment of a vehicle for example. The bracket plate 104 may be secured thereto either by a bolt extending through the aperture 108, or by cement for example. Further, a pointed ear 110 may be provided on the plate piece 104 and be pressed into the surface of the panel to which the bracket is attached for purposes of preventing rotation of the bracket 14 relative thereto when connected thereon. It will be understood of course in this arrangement shown in Fig. 3 that the offset end portion 32 of supporting member 18 will be received by the hook 30.

A bracket having means to enable the same to be attached to a panel construction or upholstery is illustrated in Figs. 5 and 6, these figures respectively showing side and rear perspective views thereof. It will be seen from these figures that the upper portion of the bracket 14 has the upper end of a pointed prong attaching member 112 secured thereto by any suitable means such as a rivet 114. The member 112 may have one or more pointed prongs thereon, as desired, and the same may be shaped to have an offset or otherwise laterally from the hook member 30 of the bracket. 14. The pointed prong member 112 readily may be inserted into the material from which a side panel of a vehicle, for example, is formed, or the upholstery of a door panel or seat covering for example, thereby affording an effective means for holding the hook 30 of a bracket 14 in any desired position where it is desired to support a receptacle assembly of any of the types illustrated herein and adapted to be supported by a hook.

Fig. 4 illustrates another form of bracket 14, similar to that shown in Fig. 2 but the plate piece 104 has one or more outwardly extending projections 118 which are engageable with the inner surface of the window trim strip of a vehicle, for example, after the plate piece 104 is inserted upwardly between the trim strip and door panel.

A hook-type bracket 14 with pointed prongs thereon is illustrated in perspective view in Fig. 7 and in side elevation in Fig. 8. The pointed prongs 112 function in the same manner as those of the brackets illustrated in Figs. 5 and 6. However, the bracket is bent to form a hook 30 which may be used to support a supporting member 18 in the same manner as hooks 30 in various other forms of brackets illustrated and described hereinabove. It will be noted from Figs. 7 and 8 that the bight portion 148 of the hook is substantially below the upper end of the bracket member, whereby a very effective supporting of the hook-like bracket member 14 is produced for use relative to a panel member, for example.

In the form of bracket 14 illustrated in Fig. 9, which also has a pair of pointed prongs 112, the shape is such that a hook 30 is formed, the width of the hook portions of the bracket being substantially as wide as the offset portion 32 of a supporting member 18, thereby affording connecting means between the bracket and supporting member similar to those illustrated in the embodiments shown in other figures.

In the embodiments and constructions of brackets illustrated in Figs. 7 through 9, such brackets readily may be formed from wire material by suitable forming machines to produce the desired shapes. Thus, quite inexpensive forms of brackets are obtained.

The various bracket and supporting members illustrated and described in the above embodiment and forms which may be used to construct the present invention lend themselves to being formed from different types of materials but particularly are suited for being fabricated from strip metallic stock, or molded from synthetic resins. Inexpensive steel strip stock is well suited for use in most of the different structures and thus minimizes the manufacturing cost thereof.

The receptacle members 20 lend themselves to being formed from a variety of different types of material and particularly flexible materials such as moisture-resistant paper, various kinds of sheet-type synthetic resins, and cloth of various kinds, either moisture-resistant or otherwise. In the embodiments wherein the receptacle member per se is of a permanent nature, it is preferred that the same be of moisture-resistant material in order to render the same suitable for containing disposable litter material of all kinds and, under these circumstances, it is best that the material be such that it may be laundered if desired on occasions. However, where the receptacle member is intended to have a disposable lining member used therewith and the latter actually contains the disposable litter, the main receptacle member may then be formed of some relatively permanent-type material such as woven cloth, synthetic resinous sheet material, heat-sealed at the seams, for example, or heavy and durable paper stock. The lining member 70 then may be formed, for example, from relatively inexpensive disposable and moisture-resistant paper stock so as to save the main receptacle member from being stained or soiled by the litter.

Regardless of whether the receptacle member per se is of a permanent or disposable nature, said receptacle member may, if desired, be finished in attractive and harmonious colors compatible with the interior of a vehicle for example, or a suitable attractive printed or woven pattern may be imposed upon the outer surfaces at least of the receptacle member.

In the various illustrations of the invention illustrated in the drawings and described hereinabove, such illustrations primarily are intended to illustrate different shapes and forms which may be used in the various components of the assemblies yet function similarly as components of the entire assembly. Thus, while different shapes and forms of some of the components are illustrated herein, substantially the same inventive concept is present in all of the illustrations and many of the differences in shapes of the various components primarily are shown for purposes of illustrating the rather wide range of attachment of the receptacle assembly to different relatively fixed portions of a vehicle or the like.

While the invention has been shown and illustrated in its several preferred embodiments, and has included certain details, it should be understood that the invention is not to be limited to the precise details herein illustrated and described since the same may be carried out in other ways falling within the scope of the invention as claimed.

I claim:

1. A litter receptacle for a vehicle and the like comprising in combination, a substantially C-shaped bracket attachable to a vehicle and including a clamping screw threadably extending through one leg thereof and operable to secure said bracket to a flanged portion of a vehicle, a hook member pivotally carried by said clamping screw for adjustable positioning thereon, a flexible receptacle having pairs of opposed side walls and the top thereof being open, and a substantially U-shaped stiffening support member having a portion detachably connected to said hook member and also connected to the upper edge of at least one pair of opposed side walls of the receptacle to hold the top of said receptacle open, whereby said receptacle is supported adjustably in depending manner from said bracket and supporting member.

2. A litter receptacle for a vehicle and the like comprising in combination, a bracket provided with means to attach the same to a vehicle for support thereby and also having a U-shaped hook member opening upwardly when supported in use, a receptacle open at its upper end to receive litter and the like and having flexible walls, and an elongated stiffening and supporting member having a flat portion intermediately of its ends slidably received by said hook member of said bracket to prevent turning of said stiffening and supporting member about its axis when held by said hook member, said supporting member being connected to a portion of the upper end of said receptacle to hold the open upper end of said receptacle extended and flexibly supported to receive litter and the like readily.

3. A litter receptacle for a vehicle and the like comprising in combination, a bracket provided with means to attach the same to a vehicle for support thereby and also having a U-shaped hook member opening upwardly when supported in use, a receptacle open at its upper end to receive litter and the like and having flexible front and rear walls, and an elongated stiffening and supporting member having a portion intermediately of its ends frictionally and slidably received between the opposite sides of U-shaped hook member of said bracket to secure said member detachably connected together in use, said supporting member being connected to the upper end of the rear wall of said receptacle to hold the upper end of said rear wall extended, whereby the upper end of the front wall of said receptacle is flexibly supported to permit insertion of litter and the like readily into the receptacle.

4. A litter receptacle for a vehicle and the like comprising in combination, a bracket provided with means to attach the same to a vehicle for support thereby and also having a U-shaped hook member opening upwardly when supported in use, a receptacle open at its upper end to receive litter and the like and having flexible front and rear walls, and an elongated stiffening and supporting member having a flat portion intermediately of its ends slidably received by said hook member of said bracket to prevent turning of said stiffening and supporting member about its axis when held by said hook member, said supporting member being connected to the upper end of the rear wall of said receptacle, the ends of said stiffening member being bent forwardly from the intermediate portion thereof and connected to the upper end of said receptacle between said front and rear walls thereof, whereby the upper edge of the front wall of said receptacle is held spaced from the rear wall thereof and is flexible to permit the insertion of litter and the like readily into the receptacle.

5. A litter receptacle for a vehicle and the like comprising in combination, a bracket provided with means to attach the same to a vehicle for support thereby and also having a U-shaped hook member opening upwardly when supported in use, a receptacle open at its upper end to receive litter and the like and having flexible walls, and an elongated stiffening and supporting member having a portion intermediately of its ends offset transversely from said member and slidably received by said hook member of said bracket to prevent movement of said stiffening and supporting member longitudinally of itself relative to said hook member when connected thereto, said supporting member being connected to a portion of the upper end of said receptacle to hold the open upper end of said receptacle extended and flexibly supported to receive litter and the like readily.

6. A litter receptacle for a vehicle and the like comprising in combination, a bracket provided with means to attach the same to a vehicle for support thereby and also having a U-shaped hook member opening upwardly when supported in use, a receptacle open at its upper end to receive litter and the like and having flexible front and rear walls, the upper end of said rear wall having a hem therein, and an elongated stiffening and supporting member slidably received within the hem of said rear wall of the receptacle and having a flat portion intermediately of its ends slidably and frictionally received by said hook member of said bracket to prevent relative movement in normal use between said hook member and said stiffening and supporting member when connected, said rear wall of said receptacle being interrupted adjacent said hook engaging portion of said stiffening member and said supporting member holding the upper end of the rear wall of said receptacle extended and the upper end of the front wall of said receptacle being flexibly supported relative to said rear wall to permit litter and the like readily to be inserted within said receptacle.

7. A litter receptacle for a vehicle and the like comprising in combination, a bracket provided with means to attach the same to a vehicle for support thereby and also having a U-shaped hook member opening upwardly when supported in use, said hook member being pivotally connected to said attaching means, whereby said hook member and attaching means may be disposed at different convenient positions relative to each other, a receptacle open at its upper end to receive litter and the like and having flexible walls, and an elongated stiffening and supporting member having a flat portion intermediately of its ends slidably received by said hook member of said bracket to prevent turning of said stiffening and supporting member about its axis when held by said hook member, said supporting member being connected to a portion of the upper end of said receptacle to hold the open upper end of said receptacle extended and flexibly supported to receive litter and the like readily.

8. The litter receptacle set forth in claim 2 further characterized by said bracket comprising pointed pronged means projectable into a fixed portion of a vehicle such as the interior upholstery, side paneling and the like, and also being formed with a U-shaped hook opening upwardly.

9. The litter receptacle set forth in claim 2 further characterized by said bracket comprising a plate-like member attachable flatly to a desired fixed surface of the interior of a vehicle and having a U-shaped hook connected thereto and opening normally upward in use.

10. The litter receptacle set forth in claim 9 in which said plate-like member is substantially parallel to the sides of the U-shaped hook and integral with one of said sides.

11. The litter receptacle set forth in claim 9 in which said plate-like member is disposed at a substantial angle to the sides of the U-shaped hook and integral with one of said sides.

12. The litter receptacle set forth in claim 9 further including projecting means on one surface of said plate-like member and engageable with the under surface of the interior trim means of the interior of a vehicle, whereby said bracket is maintained connected thereto by slidably forcing said plate-like member between the interior upholstery or side panelling and interior trim of said vehicle.

References Cited in the file of this patent

UNITED STATES PATENTS

| | | |
|---|---|---|
| 981,639 | Hall | Jan. 17, 1911 |
| 1,401,660 | White | Dec. 27, 1921 |
| 1,426,528 | White | Aug. 22, 1922 |
| 1,427,123 | Pulig | Aug. 29, 1922 |
| 1,486,566 | Crecelius | Mar. 11, 1924 |
| 1,606,944 | Johnson | Nov. 16, 1926 |
| 1,794,976 | Mueller | Mar. 3, 1931 |
| 1,866,107 | Hiering | July 5, 1932 |
| 1,996,303 | McConnell | Apr. 2, 1935 |
| 2,061,302 | Egler | Nov. 17, 1936 |
| 2,263,956 | Russell | Nov. 25, 1941 |
| 2,483,844 | Ranseen | Oct. 4, 1949 |
| 2,576,327 | Wright | Nov. 27, 1951 |
| 2,726,477 | Firkins | Dec. 13, 1955 |